H. ASHER.
COMBINED EYEGLASS CASE AND SCREW DRIVER.
APPLICATION FILED APR. 26, 1912.
1,041,402.
Patented Oct. 15, 1912.
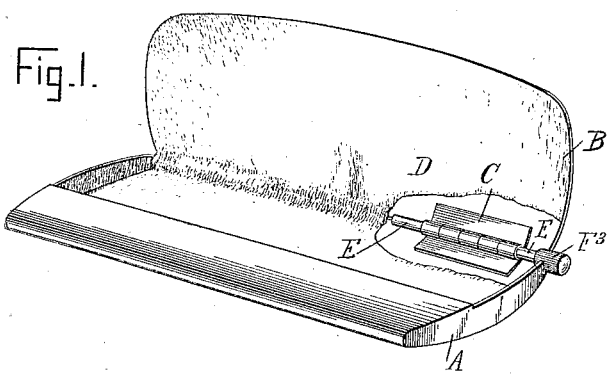
Fig. 1.
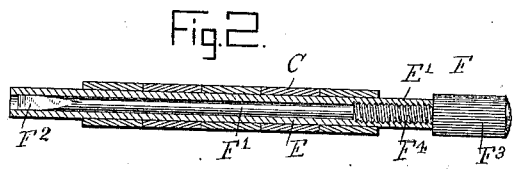
Fig. 2.
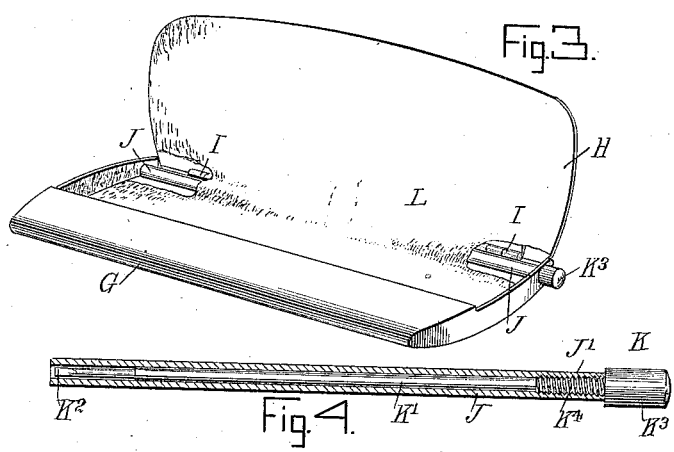
Fig. 3.
Fig. 4.
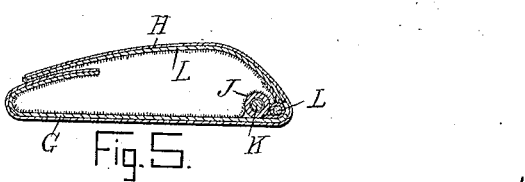
Fig. 5.
WITNESSES
G. K. Reichenbach.
Geo. J. Hoster
INVENTOR
Herman Asher
BY Munn & Co.
ATTORNEYS

UNITED STATES PATENT OFFICE.

HERMAN ASHER, OF NEW YORK, N. Y.

COMBINED EYEGLASS-CASE AND SCREW-DRIVER.

1,041,402.  Specification of Letters Patent.  Patented Oct. 15, 1912.

Application filed April 26, 1912. Serial No. 693,327.

*To all whom it may concern:*

Be it known that I, HERMAN ASHER, a citizen of the United States, and a resident of the city of New York, borough of the Bronx, in the county and State of New York, have invented a new and Improved Combined Eyeglass-Case and Screw-Driver, of which the following is a full, clear, and exact description.

The object of the invention is to provide a new and improved combined eyeglass case and screw driver, of which the case is adapted to carry eyeglasses in the usual manner, and the screw driver is mounted on the case to permit convenient removal thereof for repairing the eyeglasses in case of need. For the purpose mentioned use is made of a tube held in the eyeglass case and extending at one end to the outside of the case, and a screw driver adapted to be passed into said tube through the open end thereof, the screw driver having a head extending outside of the tube for removal of the screw driver from the tube, the said tube and screw driver having fastening means between them for removably fastening the screw driver in place in the tube.

A practical embodiment of the invention is represented in the accompanying drawings forming a part of this specification, in which similar characters of reference indicate corresponding parts in all the views.

Figure 1 is a perspective view of a combined eyeglass case and screw driver, part of the lining of the case being broken out and the cover being shown in open position; Fig. 2 is an enlarged sectional side elevation of the screw driver and its receiving tube, the latter forming the pintle for one of the hinges connecting the case and its cover with each other; Fig. 3 is a perspective view of a modified form of the combined eyeglass case and screw driver, parts of the lining being broken out and the cover being shown in open position; Fig. 4 is an enlarged sectional side elevation of the screw driver and its tube shown in Fig. 3; and Fig. 5 is an enlarged cross section of the combined eyeglass case and screw driver shown in Fig. 3, the cover being closed.

As illustrated in Figs. 1 and 2, the eyeglass case A, of usual construction, is connected with its cover B by hinges C, one of which is shown in Fig. 1, the hinges being normally covered by the lining D of the eyeglass case A and its cover B. A tube E forms the pintle for the hinge C shown in Fig. 1, and in this tube is placed a screw driver F having a shank $F^1$ terminating at its inner end in the usual bit $F^2$ and its outer end in a head $F^3$ adapted to abut against the outer end of the tube E which latter is extended beyond the ends of the hinge C so that its outer end is close to one end of the case A and its cover B. A portion of the end of the case A at the hinge C is recessed to accommodate the head $F^3$ which extends slightly beyond the end of the case and its cover so that the screw driver can readily be removed from its tube E. The shank $F^1$ adjacent the head $F^3$ is provided with a screw thread $F^4$ screwing into an interior screw thread $E^1$ on the outer end of the tube E so as to normally hold the screw driver F in the tube E. When it is desired to use the screw driver F for repairing the eyeglasses carried in the case A, then it is only necessary for the operator to turn the head $F^3$ to unscrew the thread $F^4$ from the thread $E^1$ in the tube E and to finally pull out the screw driver from the tube E. The screw driver after being removed can be readily utilized to make the necessary repairs on the eyeglasses.

It will be noticed that by the arrangement described the screw driver, with the exception of a small portion of its head $F^3$ is normally concealed in the case, and the screw driver can be readily removed from the case for repairing the eyeglasses whenever it is deemed necessary.

In the modified form shown in Figs. 3, 4 and 5, the eyeglass case G is provided with a cover H connected by hinges I with the case and in the cover H adjacent to and parallel with the pintles of the hinges I is arranged a tube J adapted to carry the screw driver K, the tube J being concealed by the lining L of the case G and the cover H. The screw driver K is provided with a shank $K^1$ terminating at its inner end in a bit $K^2$ and at its outer end in a head $K^3$, which latter extends through an opening in one end of the case G so that the head can be readily taken hold of whenever it is desired to remove the screw driver K from the tube J. The shank $K^1$ is provided adjacent the head $K^3$ with threads $K^4$ adapted to screw into corresponding threads $J^1$ formed interiorly on the outer end of the tube J. Thus by the arrangement described the screw driver K is normally secured to the tube J the same as the screw driver F is attached to the tube E, and the screw driver K can be readily removed at any time from the tube J for repairing the eyeglasses in the same manner as above described in reference to Figs. 1 and 2.

From the foregoing it will be seen that by the arrangement described, the screw driver and its tube do not interfere with the proper housing and carrying of the eyeglasses in the case A, and the screw driver can be readily removed at any time for repairing the eyeglasses as described.

Having thus described my invention, I claim as new and desire to secure by Letters Patent:

1. The combination with an eyeglass case of a tube held in the case, and a screw driver adapted to be passed into the said tube through one end thereof, the said tube and screw driver having fastening means between them for removably fastening the screw driver in place in the tube, and the said screw driver having a head extending through one end of the case and somewhat beyond the same.

2. The combination with an eyeglass case of a tube held in the case and extending at one end close to one end of the case, the said outer end being provided with a screw thread, and a screw driver adapted to be passed into the said tube through the outer end thereof, the screw driver having a head and a threaded portion adjacent the head and screwing into the threaded end of the said tube, the said screw driver head extending through one end of the case to the outside thereof.

3. The combination with an eyeglass case having a cover and hinges connecting the cover with the case, of a tube forming the pintle of one of the said hinges, the outer end of the tube being provided with a screw thread, and a screw driver adapted to be passed into the said tube through the outer end thereof, the screw driver having a head and a threaded portion adjacent the head and screwing into the said threaded end of the tube, the said head extending through one end of the case to the outside thereof.

4. The combination with an eyeglass case having a cover, and hinges connecting the cover with the case of a tube forming the pintle of one of the hinges and projecting beyond the ends of this hinge, and a screw driver adapted to be passed into said tube through the outer end thereof, the screw driver having a head and a threaded portion adjacent the said head and screwing into the outer threaded end of the said tube, the head abutting against the outer end of the tube and extending through one end of the cover to the outside thereof.

In testimony whereof I have signed my name to this specification in the presence of two subscribing witnesses.

HERMAN ASHER.

Witnesses:
BENJAMIN E. COHEN,
PHELEP HATOWSKY.

---

Copies of this patent may be obtained for five cents each, by addressing the "Commissioner of Patents, Washington, D. C."